3,330,775
SOLUBILIZATION PROCESS

David M. Marquis, Orinda, Calif., assignor to Chevron Research Company, a corporation of Delaware
No Drawing. Filed June 15, 1964, Ser. No. 375,323
9 Claims. (Cl. 252—363.5)

This invention relates to a method for increasing the solubility rate of fumaric acid in water. More particularly, it relates to an improved method for the substantial increase of the aqueous solution rate of fumaric acid requiring the addition of only minor amounts of non-acidic matter.

Fumaric acid is widely used in the art as an acidulation agent, as an antioxidant, as a dyeing mordant, and the like. It has a rather slow rate of solution in water and for many uses this characteristic is very inconvenient. Thus, a form of fumaric acid which is quick dissolving and reliably positive in dissolution is particularly desirable. This, of course, suggests additives but those known and practiced in the art, which includes sugars, sodium chloride, ammonium chloride, and the like, frequently comprise an excessive portion of the solid, i.e., as much as 20 percent of the solid and more.

It has now been found that organic sulfamates in minor amounts effectively solubilize fumaric acid. Thus, from about 0.1 to 5.0 parts of an alkaline hydrocarbyl sulfamate salt substantially homogenously incorporated in 99.9 to 95 parts, respectively, of fumaric acid increases fumaric acid solution rate by as much as a factor of 60 to 120 even at relatively cold water temperatures. Hydrocarbyl sulfamate salts having from about 6 to 22 carbon atoms in which the salt cation may be sodium, potassium, lithium, ammonium, and the like, are suitable solubilization agents.

In a preferred embodiment a substantially concentrated solution of fumaric acid in a volatile solvent, preferably water, is prepared and for each 100 parts of fumaric acid from 1 to 2.5 parts of a sulfate such as sodium-N-cyclohexylsulfamate is added to the solution. The stirred homogeneous solution is then spray dried in a conventional spray drying apparatus and the resulting powder collected for use. It is found to be free flowing and substantially non-hygroscopic and in general of a particle size which will pass through about a standard minus 80 mesh screen. At 60° F. fumaric acid prepared in this manner is fully dissolved within a period of one minute. It is especially suitable for use where rapid solubility in cold water is required. Surprisingly, in view of the fact that sulfamates are known to be degradable under acid conditions, little, if any, degradation results in the present use.

The amount of sulfamate salt which is effective for solubilization varies. As little as 0.1 weight percent results in an appreciable solubilization rate increase. On the other hand, the use of relative amounts substantially larger than about 2.5 parts per 97.5 parts of fumaric acid are not particularly desirable for purposes of solubilization because for all practical purposes solution rates are already highly satisfactory at the 2.5 part level. While larger amounts may be used, for example 40 parts per 60 parts of acid, such use is not usually economic and, of course, means the introduction of a larger amount of non-acidic material into the desired product. On the other hand, other water-soluble materials, such as table salt, sugar, flavoring, and the like, can be added to the sulfamate-fumaric acid composition, so long as the above fumaric acid sulfamate compositional ratio is maintained, and yet enjoy fast solution rates.

Sulfamate salts in general having at least a 6 carbon-atom hydrocarbyl group are satisfactory solubilization agents. So long as there is no excessive imbalance as between the hydrocarbon portion and the non-hydrocarbon polar portion of the sulfamate salt, effective solubilization of fumaric acid results. At least up to about a 22 carbon-atom hydrocarbyl group, sulfamate salts are satisfactory solubilization agents. No particular advantage is seen in the use of higher molecular weight sulfamates. In general, sulfamates useful in the process have at least 6 carbon atoms as characterized by the general formula:

$$R\text{---}R'_n NHSO_3M$$

in which R may be hydrogen or alkyl having less than 17 carbon atoms, R' is a 6 carbon-atom carbocyclic hydrocarbyl radical and may be cyclohexyl or phenyl ($C_6H_5$), $n$ may be 0 or 1, M is an alkaline cation.

Representative sulfamates useful in the present process are the sodium and ammonium salts of the following sulfamic acids: N-cyclohexyl, N-phenyl, N-p-tolyl, N-p-dodecylphenyl, N-n-hexyl, N-n-octyl, N-n-hexadecylphenyl, N-4-methylcyclohexyl, N-2-methyloctyl, N-p-t-butylphenyl, N-4-t-butylcyclohexyl, N-n-undecyl, N-p-polypropyl ($C_{12}$–$C_{15}$) phenyl, N-p-$C_{10}$–$C_{16}$ (cracked wax benzene alkylate) phenyl, N-4-ethylcyclohexyl, N-4-n-propylcyclohexyl, N-4-i-butylcyclohexyl, and the like sulfamate salts. The sodium salts are preferred.

A better understanding of the invention will be obtained from the following illustrative examples:

Example 1

To a slurry of 500 grams of powdered fumaric acid in 500 grams of water were added 10 grams of sodium N-cyclohexyl sulfate. The mixture was thoroughly stirred and spray-dried in a laboratory spray drier. The resulting powder was free flowing and non-hygroscopic. It all passed a minus 80 screen and had no appreciable amount of undesirable fines.

Similarly, a sodium N-p-dodecylbenzene (prepared as described in my copending application) sulfamate-fumaric acid composition was prepared in the weight ratio of 2.5 parts of the sulfamate to 97.5 parts of powdered fumaric acid. The spray-dried product was also a free-flowing, non-hydroscopic powder.

SOLUBILIZATION TEST

Example 2

The rate of solubility of the products of Example 1 was tested by adding 0.17 part of the fumaric-sulfamate composition to 100 parts of water at 60° F. under comparable conditions of stirring and timing and the following results noted:

| Fumaric acid: | Time to dissolve, min. |
|---|---|
| (1) Untreated fumaric | [1] >120 |
| (2) Na-N-cyclohexyl sulfamate-fumaric | 1 |
| (3) Na-N-p-dodecylbenzene sulfamate-fumaric | 2 |

[1] From visual estimate, little or no fumaric acid had dissolved.

Example 3

An aliquot of untreated fumaric acid was placed in water as in Example 2 above except that sodium N-cyclohexyl sulfamate had been previously dissolved in the water. The weight ratio of the sulfamate salt to fumaric acid was 2.5:97.5. Under the above test conditions and after 120 minutes, no apparent amount of the acid had dissolved.

Example 4

A slurry of fumaric acid in an aqueous solution of sodium N-cyclohexyl sulfamate as in 3 was evaporated to dryness on a steam plate under mild conditions such that until evaporation was completed there remained a slurry at all times. The resulting powder was free flowing and non-hygroscopic. Under the conditions of the above solubilization test, no appreciable solubility could be noted after 120 minutes.

*Example 5*

An aliquot of the product of Example 4 was ground to further reduce the particle size and tested as above. The results were essentially as in Example 4.

The above examples illustrate that the incorporation of minor amounts of alkaline N-hydrocarbyl sulfamate salts into solid fumaric acid greatly increases the solid acid solubility rate. A mere surface layer of the sulfamate is shown to be inadequate.

Spray drying of an aqueous slurry is a preferred means of obtaining a substantially homogeneous mixture for several reasons including the relatively short time at elevated temperatures and the relatively small amount of solvent which must be eliminated as compared to total solutions. On the other hand, solutions may also be evaporated to obtain the desired product.

*Example 6*

Aliquots of the products of Example 1 were stored in conventional stoppered containers for about 10 months for the purpose of testing the storage characteristics thereof. No change in color, odor, or solubility rate could be discerned from the storage.

These data further indicate that fumaric acids may be effectively compounded with minor amounts of sulfamate salts, particularly sodium N-cyclohexyl sulfamate, with the result that solubilization rates of the acid in water and water-like solvents are substantially improved.

I claim:

1. A method of increasing the solubility rate of solid fumaric acid in water which comprises substantially homogeneously incorporating in fumaric acid from about 0.1 to 67 parts of a sulfamate salt per 100 parts by weight of said acid, said salt containing at least six carbon atoms and being of the formula:

$$R—R'_n—NHSO_3M$$

wherein R is selected from the group consisting of hydrogen and alkyls containing less than 17 carbon atoms, wherein R' is selected from the group consisting of phenyl and cyclohexyl, wherein $n$ is selected from the group consisting of 0 and 1, and wherein M is an alkaline cation, thereby appreciably increasing said rate.

2. The method of claim 1 wherein M of said formula is sodium.

3. A composition consisting essentially of fumaric acid having substantially homogeneously incorporated therein a sulfamate containing at least six carbon atoms of the general formula:

$$R—R'_n—NHSO_3Na$$

wherein R is selected from the group consisting of hydrogen and alkyls having less than 17 carbon atoms, wherein R' is selected from the group consisting of phenyl and cyclohexyl, wherein $n$ is selected from the group consisting of 0 and 1, and wherein from 0.1 to about 40 parts by weight of said sulfamate per 99.9 to 60 parts, respectively, of fumaric acid are contained in said composition.

4. A composition consisting essentially of fumaric acid having incorporated therein sodium N-cyclohexyl sulfamate wherein from 0.1 to 10 parts of said sulfamate per 100 parts of fumaric acid are contained in said composition.

5. The method of increasing the solubility rate of solid fumaric acid in water which comprises incorporating in solid fumaric acid from about 0.1 to 67 parts of sodium-N-cyclohexyl sulfamate per 100 parts by weight of said acid, thereby appreciably increasing said rate.

6. The method of increasing the solubility rate of solid fumaric acid in water which comprises spray-drying an aqueous slurry of fumaric acid containing from 0.1 to 10 parts of a sulfamate salt per 100 parts of said acid, said sulfamate containing at least six carbon atoms and being of the general formula:

$$R—R'_n—NHSO_3M$$

wherein R is selected from the group consisting of hydrogen and alkyls having less than 17 carbon atoms, wherein R' is selected from the group consisting of phenyl and cyclohexyl, where $n$ is selected from the group consisting of 0 and 1 and wherein M is selected from the group consisting of sodium, potassium, lithium and ammonium, thereby substantially homogeneously incorporating said sulfamate in solid fumaric acid.

7. The method of increasing the solubility rate of solid fumaric acid in water which comprises spray-drying an aqueous solution of fumaric acid, said solution containing from about 0.1 to 10 parts of a sulfamate per 100 parts of said acid, wherein said sulfamate contains at least six carbon atoms and is of the formula:

$$R—R'_n—NHSO_3M$$

wherein R is selected from the group consisting of hydrogen and alkyls having less than 17 carbon atoms, wherein R' is selected from the group consisting of phenyl and cyclohexyl, wherein $n$ is selected from the group consisting of 0 and 1 and wherein M is an alkaline cation selected from the group consisting of sodium, potassium, lithium and ammonium, thereby substantially homogeneously incorporating said sulfamate in solid fumaric acid and thereby appreciably improving said rate.

8. A solid fumaric acid composition having an improved solubility rate in water obtained by spray-drying an aqueous solution of fumaric acid and a sulfamate salt wherein said solution contains for each 100 parts by weight of said acid from about 0.1 to 10 parts of a sulfamate containing at least six carbon atoms of the formula:

$$R—R'_n—NHSO_3M$$

wherein R is selected from the group consisting of hydrogen and alkyls having less than 17 carbon atoms, wherein R' is selected from the group consisting of phenyl and cyclohexyl, wherein $n$ is selected from the group consisting of 0 and 1 and wherein M is an alkaline cation selected from the group consisting of sodium, potassium, lithium and ammonium, thereby substantially homogeneously incorporating said sulfamate in solid fumaric acid.

9. A solid fumaric acid composition having an improved solubility rate in water obtained by spray-drying an aqueous slurry of fumaric acid and a sulfamate salt wherein said slurry contains for each 100 parts by weight of said acid from about 0.1 to 10 parts of a sulfamate containing at least six carbon atoms of the formula:

$$R—R'_n—NHSO_3M$$

wherein R is selected from the group consisting of hydrogen and alkyls having less than 17 carbon atoms, wherein R' is selected from the group consisting of phenyl and cyclohexyl, wherein $n$ is selected from the group consisting of 0 and 1 and wherein M is an alkaline cation selected from the group consisting of sodium, potassium, lithium and ammonium, thereby substantially homogeneously incorporating said sulfamate in solid fumaric acid.

References Cited

UNITED STATES PATENTS

| | | | |
|---|---|---|---|
| 2,116,583 | 5/1938 | Munz | 252—355 |
| 2,889,226 | 6/1959 | Hinkley | 99—78 X |
| 3,151,986 | 10/1964 | Van Ness | 252—363.5 X |
| 3,198,551 | 6/1965 | Metcalf et al. | 252—137 X |

LEON D. ROSDOL, *Primary Examiner.*

J. T. FEDIGAN, *Assistant Examiner.*